(12) United States Patent
Tindall et al.

(10) Patent No.: US 12,316,082 B2
(45) Date of Patent: May 27, 2025

(54) CABLE GLANDS WITH MULTIPLE SEAL POSITIONS

(71) Applicant: Hubbell Limited, London (GB)

(72) Inventors: Andrew James Tindall, Greater Manchester (GB); Lawrence Murray Lonergan, Greater Manchester (GB); Carl Jackson, Greater Manchester (GB)

(73) Assignee: Hubbell Limited, London (GB)

( * ) Notice: Subject to any disclaimer, the term of this patent is extended or adjusted under 35 U.S.C. 154(b) by 137 days.

(21) Appl. No.: 17/797,973

(22) PCT Filed: Feb. 5, 2021

(86) PCT No.: PCT/GB2021/050252
§ 371 (c)(1),
(2) Date: Aug. 5, 2022

(87) PCT Pub. No.: WO2021/156622
PCT Pub. Date: Aug. 12, 2021

(65) Prior Publication Data
US 2023/0044485 A1    Feb. 9, 2023

(30) Foreign Application Priority Data

Feb. 6, 2020  (GB) ..................................... 2001581

(51) Int. Cl.
*H02G 15/013*   (2006.01)
(52) U.S. Cl.
CPC ................. *H02G 15/013* (2013.01)
(58) Field of Classification Search
None
See application file for complete search history.

(56) References Cited

U.S. PATENT DOCUMENTS

| 4,702,710 A | 10/1987 | Dittman et al. |
| 6,274,818 B1 * | 8/2001 | Aponte ................ H02G 3/0406 |
| | | 174/97 |

(Continued)

FOREIGN PATENT DOCUMENTS

| CA | 1 318 372 C | 5/1993 |
| CN | 209982024 U | 1/2020 |

(Continued)

OTHER PUBLICATIONS

EP0680128_Translation (Year: 1995).*

(Continued)

*Primary Examiner* — Binh B Tran
*Assistant Examiner* — Muhammed Azam
(74) *Attorney, Agent, or Firm* — Michael Best & Friedrich LLP

(57) ABSTRACT

A cable gland (1) comprising: an entry component (2) sized to fit through an orifice in a surface and having a flange (11) arranged to bear against the surface around the orifice; a middle component (3) in threaded engagement with the entry component (2); and a back component (4) in threaded engagement with the middle component (3), the cable gland (1) defining a through bore (5) for a cable through the entry component (2), the middle component (3) and the back component (4); the cable gland (1) further comprising a sealing body (6) which is arranged to provide a seal in at least two positions from the group comprising: between the surface and the flange (11) of the entry component (2) (typically acting as a ingress protection washer); between the cable and the back component (4) (typically acting as an ingress protection seal); between the back component (4) and the middle component (3) (typically acting as a shroud); and between the middle component (3) and the entry component (2) (typically acting as a deluge boot).

6 Claims, 4 Drawing Sheets

(56) References Cited

U.S. PATENT DOCUMENTS

| | | | | |
|---|---|---|---|---|
| 8,748,746 B2* | 6/2014 | Brasier | ................ | H02G 3/0443 |
| | | | | 174/505 |
| 9,601,914 B2* | 3/2017 | Chiu | .................... | H02G 15/007 |
| 9,762,041 B1* | 9/2017 | Yeh | ...................... | H02G 3/0406 |
| 9,866,006 B2* | 1/2018 | Albert | .................... | H01R 13/741 |
| 10,014,673 B2* | 7/2018 | Yeh | ...................... | H02G 3/0616 |
| 10,483,734 B2* | 11/2019 | Yeh | ...................... | H02G 3/0616 |
| 2003/0226680 A1* | 12/2003 | Jackson | ................ | H02G 15/04 |
| | | | | 174/655 |
| 2004/0069522 A1* | 4/2004 | Jackson | ................ | H02G 3/065 |
| | | | | 174/669 |
| 2007/0049085 A1* | 3/2007 | Stagi | ................ | H01R 13/5202 |
| | | | | 439/199 |
| 2010/0140877 A1* | 6/2010 | Pratley | .................. | H02G 3/088 |
| | | | | 277/316 |
| 2011/0042139 A1* | 2/2011 | Duquette | ................ | F16L 9/147 |
| | | | | 174/84 R |
| 2011/0226084 A1* | 9/2011 | Chiou | .................... | F16C 1/102 |
| | | | | 74/502.4 |
| 2011/0230083 A1 | 9/2011 | Anderson et al. | | |
| 2015/0222107 A1* | 8/2015 | Jackson | ............... | H02G 15/046 |
| | | | | 174/142 |
| 2016/0126709 A1* | 5/2016 | Maeda | ................ | B60R 16/0215 |
| | | | | 174/68.3 |
| 2017/0018871 A1 | 1/2017 | Vaccaro | | |
| 2017/0149232 A1* | 5/2017 | Rivest | .................. | H02G 3/0683 |
| 2018/0301885 A1* | 10/2018 | Jackson | ............... | H02G 15/013 |
| 2019/0040979 A1* | 2/2019 | Shemtov | ............... | H02G 3/0406 |
| 2019/0052070 A1* | 2/2019 | Hattori | .................... | H02G 3/22 |
| 2019/0267781 A1* | 8/2019 | Pineaud | ................ | H02G 15/04 |
| 2020/0395715 A1* | 12/2020 | Martinez | ................ | H01B 7/14 |
| 2021/0234354 A1* | 7/2021 | Reid | .................... | H02G 3/0675 |
| 2021/0344137 A1* | 11/2021 | Cairns | .................. | H01R 13/629 |
| 2022/0056767 A1* | 2/2022 | Part | ...................... | E21B 17/026 |
| 2022/0399705 A1* | 12/2022 | Jackson | ............... | H02G 15/046 |
| 2022/0399710 A1* | 12/2022 | Jackson | ............... | H02G 3/0675 |
| 2023/0044485 A1* | 2/2023 | Tindell | ................ | H02G 3/0675 |
| 2023/0069558 A1* | 3/2023 | Lonergan | ............... | H02G 15/04 |
| 2023/0086292 A1* | 3/2023 | Jackson | ............... | H02G 3/0675 |

FOREIGN PATENT DOCUMENTS

| | | | | |
|---|---|---|---|---|
| DE | 19615442 A1 | * 10/1997 | ......... | F16L 25/0045 |
| DE | 20218298 U1 | * 2/2003 | ......... | H02G 3/0406 |
| DE | 20 2007 015858 U1 | 1/2008 | | |
| DE | 202009002925 U1 | * 6/2009 | ......... | F16L 25/0045 |
| DE | 102010029725 A1 | * 12/2011 | ............... | F16L 7/02 |
| DE | 102011008270 A1 | * 7/2012 | ......... | H02G 15/007 |
| EP | 0 314 307 A | 5/1989 | | |
| EP | 0 680 128 A1 | 11/1995 | | |
| EP | 2 493 040 A1 | 8/2012 | | |
| EP | 3043101 A1 | * 7/2016 | ......... | F16L 25/0045 |
| FR | 2982088 A1 | * 5/2013 | ......... | H02G 3/0406 |
| GB | 2 138 218 A | 10/1984 | | |
| GB | 2 241 388 A | 8/1991 | | |
| GB | 2 244 388 A | 11/1991 | | |
| GB | 2 258 350 A | 2/1993 | | |
| IE | 20100795 A1 | * 6/2011 | | |
| KR | 20110113255 A | * 10/2011 | | |
| KR | 101404557 B1 | 6/2014 | | |
| KR | 20150142713 A | * 12/2015 | | |
| KR | 20160032212 A | * 3/2016 | | |

OTHER PUBLICATIONS

International Search Report and Written Opinion mailed in Application No. PCT/GB2021/050252, dated Apr. 22, 2021.
Search Report issued in GB Application No. 2001581.4, dated Jul. 27, 2020.
Examination Report issued in GB Application No. 2001581.4, dated Apr. 18, 2024.

* cited by examiner

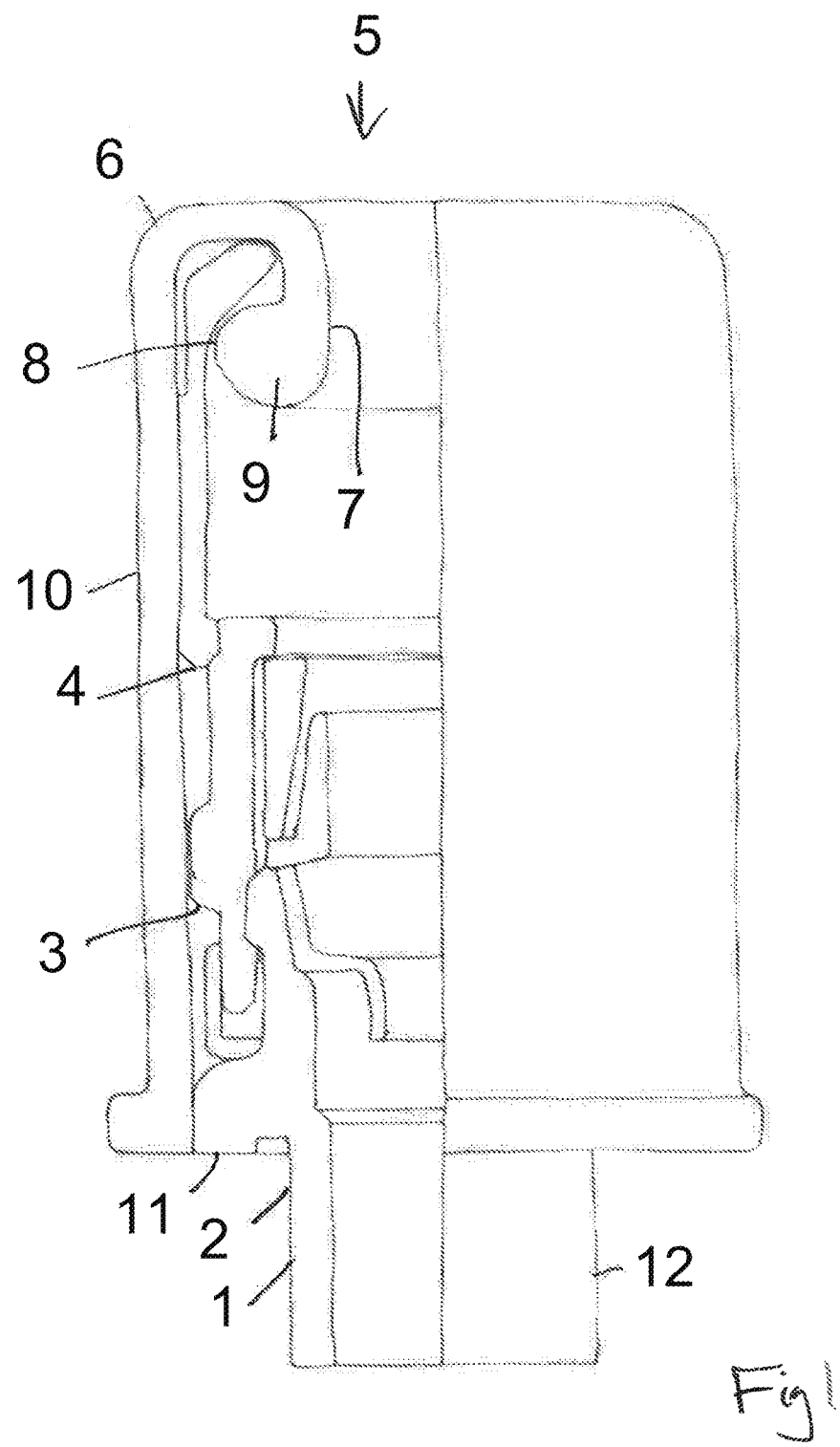

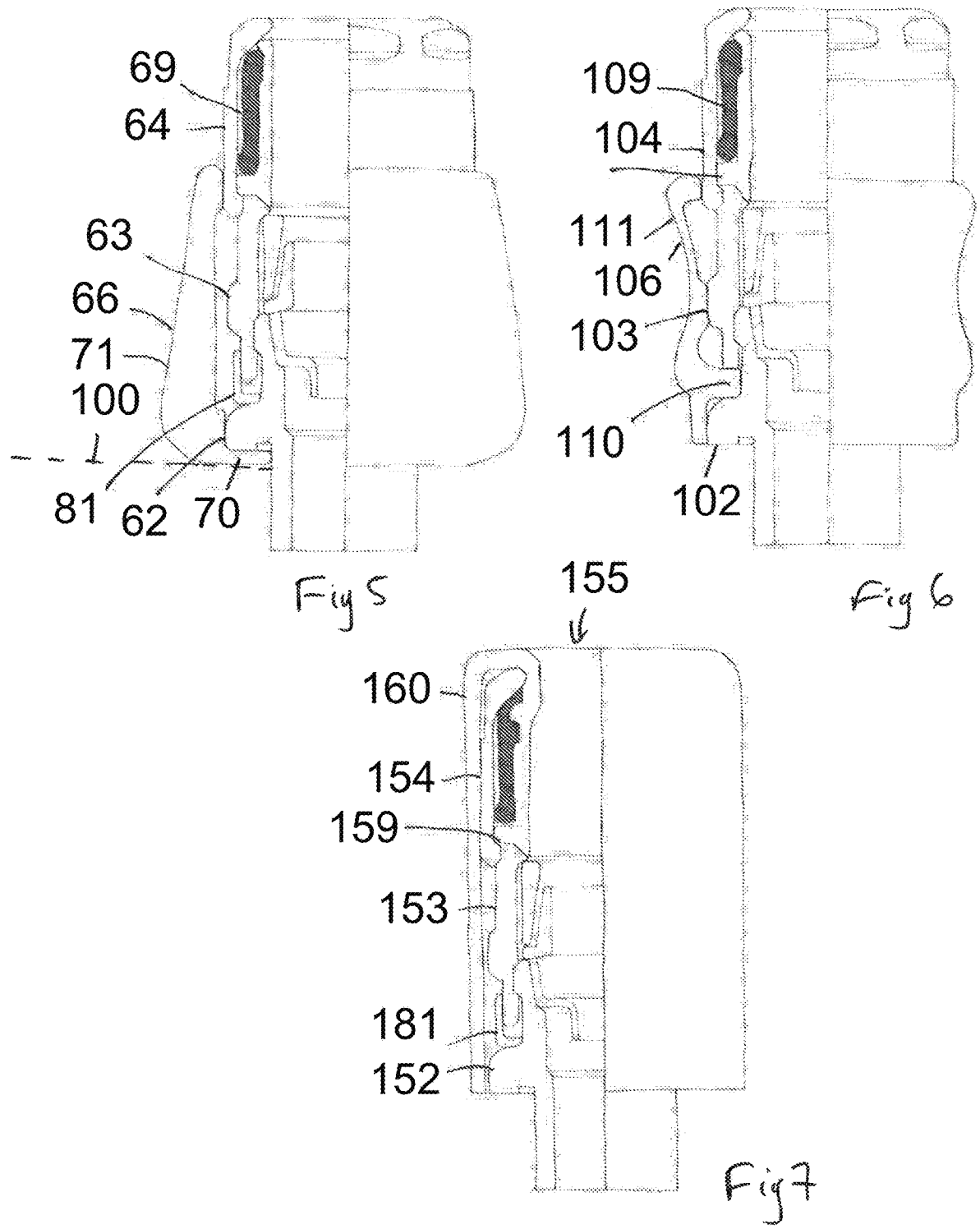

CABLE GLANDS WITH MULTIPLE SEAL POSITIONS

This invention relates to cable glands, and to related methods.

Cable glands are commonly used for sealing around a cable or conduit passing through an opening in a wall or bulkhead. For example, cable gland assemblies may be used to seal around a cable entering an enclosure such as a junction box, containing electrical equipment, to prevent fluids entering the enclosure or explosive forces exiting the enclosure. In some instances, cable glands can be used in harsh environments, such as underwater, in high temperatures, or harsh chemical environments.

Typically, a cable gland includes a body, through which the cable passes. The body is formed of a number of parts, that are fixed together to assemble the gland. Each joint can provide a source of leakage. A clamp to grip the cable, and prevent it being pulled out of the gland is provided in the body, along with a number of seals.

In many examples, the clamp also acts as one of the seals, or the seals may require tightening of the clamp and/or portions of the body. However, where the clamp fails or loosens, or the body is over or under tightened, this means that the seal also fails or weakens. Furthermore, it is important that the clamp does not damage the cable. Also, under compressive force, cold flow of the cable can occur, where the surface of the cable moves away from the compressive element, further risking loss of clamping force or ingress protection.

According to a first aspect of the invention, there is provided a cable gland comprising:
- an entry component sized to fit through an orifice in a surface and having a flange arranged to bear against the surface around the orifice;
- a middle component in threaded engagement with the entry component; and
- a back component in threaded engagement with the middle component, the cable gland defining a through bore for a cable through the entry component, the middle component and the back component;

the cable gland further comprising a sealing body which is arranged to provide a seal in at least two positions from the group comprising:
a. between the surface and the flange of the entry component;
b. between the cable and the back component;
c. between the back component and the middle component; and
d. between the middle component and the entry component.

As such, rather than providing separate components, a single sealing body can act to seal multiple locations.

Typically, the sealing body will be of the form of a shroud. Especially where one of the positions is between the back component and the middle component, the sealing body may be anchored relative to the entry component, middle component and back component by being held captive at at least one other position at which it acts as a seal (such as positions a, b or d).

In such a case, the sealing body may be formed of a resilient material, such that it can be stretched and rolled over an outer surface at least one, two or three of the entry component, middle component and back component. It may also be shaped so that it is possible to roll the sealing body as to rolled back over itself in order to uncover the outer surface(s).

The sealing body may be shaped such that, when the cable gland is positioned with the sealing body providing the seal in the positions and with an exit orifice of the through bore in the back component uppermost, the seal does not pool liquid that falls vertically onto it.

The sealing body may have an internal through bore through which the cable can pass. Where the sealing body is formed of a resilient material, the sealing body may be shaped such that it can accept a range of diameters of cable in the through bore, with stretching of the resilient material accommodating for the varying size of cable whilst still providing a seal in the positions throughout the range of diameters.

As such, the sealing body may act, when it seals at the following positions, as the following:
- at position a, as an ingress protection (IP) washer;
- at position b, as an ingress protection (IP) seal;
- at position c, as a shroud; and/or
- at position d, as a deluge boot.

In accordance with a second embodiment of the invention, there is provided a method of installing a sealing body on a cable gland, the method comprising
providing a cable gland comprising:
- an entry component sized to fit through an orifice in a surface and having a flange arranged to bear against the surface around the orifice;
- a middle component in threaded engagement with the entry component; and
- a back component in threaded engagement with the middle component, the cable gland defining a through bore for a cable through the entry component, the middle component and the back component;
the cable gland further comprising a sealing body which is arranged to provide a seal in a position selected from the group comprising:
a. between the surface and the flange of the entry component;
b. between the cable and the back component;
c. between the back component and the middle component; and
d. between the middle component and the entry component.

the method further comprising inserting a cable through the through bore and moving the sealing body so as to seal one of the other positions of the group.

Typically, the step of moving the sealing body may comprise rolling or sliding the sealing body over an outer surface of at least one of the entry component, the middle component and the back component.

The sealing body and/or the cable gland may have any of the optional features of the first embodiment of the invention. After the sealing body has been moved, the cable gland may be in compliance in the first aspect of the invention.

There now follows, by way of example only, description of embodiments of the invention, described with reference to the accompanying drawings, in which:

FIG. 1 shows a partial cross section through a cable gland in accordance with a first embodiment of the invention;

FIGS. 4 to 7 shows partial cross sections through cable glands in accordance with third to sixth embodiments of the invention.

Figure 2A:
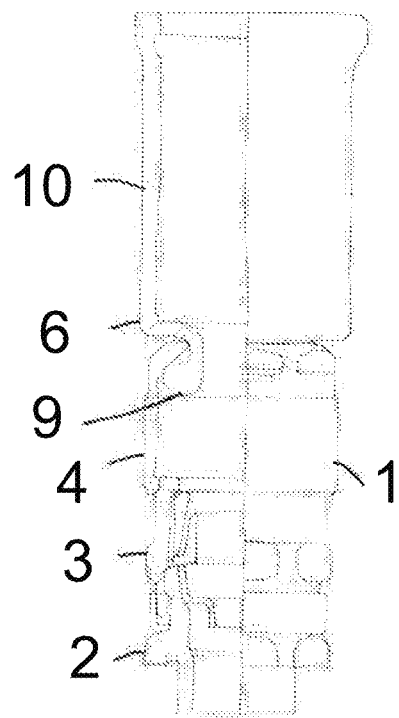
FIGS. 2a to 2c show a partial cross section through the cable gland of FIG. 1, as the sealing body is rolled over the cable gland.

A cable gland 1 in accordance with a first embodiment of the invention is shown in FIGS. 1 and 2a to 2c of the accompanying drawings. The cable gland 1 comprises an entry component 2, a middle component 3 in threaded engagement with the entry component 2 and a back component 4 in threaded engagement with the middle component 3. A through bore 5 is provided through all three components 2, 3, 4 through which a cable (not shown) can pass. The entry component 2 is provided with a flange portion 11 which will abut a surface in use, and a threaded portion 12 which will extend through an orifice in the surface in use.

In this embodiment, a sealing body 6 is provided, which provides both a seal between the back component 4 and a cable in the through bore 5. As such, it provides a sealing surface 7 for sealing against the cable and a sealing surface 8 for sealing against the back component 4. The sealing body is typically formed of a resilient, flexible elastomer, such as silicone, neoprene or rubber.

As such, this provides an ingress protection seal such as is provided in the prior art such as our earlier PCT application published as WO2019/220146. However, it also provides the additional features discussed below.

The sealing body 6 is formed of a (wider) captive sealing head 9 which provides the sealing surfaces 7, 8. This captive sealing head 9 will be held captive between the back component and the cable in use. The sealing body also has a generally tubular (thinner) tail portion 10. The tail portion covers the outer surfaces of the entry 2, middle 3 and back 4 components so as to seal the outer surfaces (and in particular the junction between the back component 4 and the middle component 3, much as though a separate shroud would. As such, the sealing body combines the functions of these two separate integers.

Figure 2B:
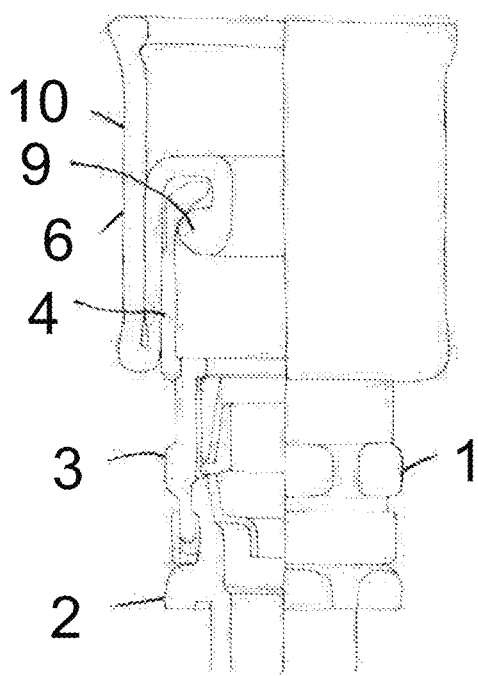
Figure 2C:
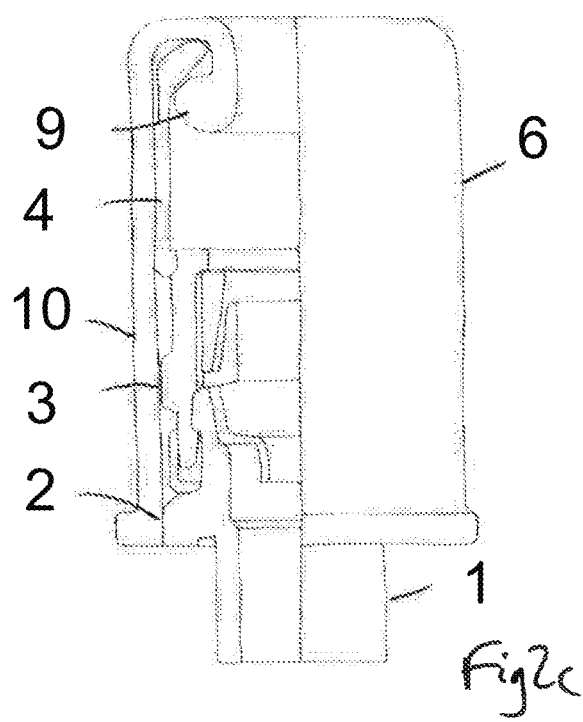

Furthermore, as FIGS. 2a to 2c show, the assembly of such a gland is simplified. The cable gland 10 can be placed over the cable (not-shown) in the position shown in FIG. 2a, with the tail portion not covering the outer surfaces of the components 2, 3, 4, and extending backwards from the cable gland 1.

In order to have the sealing body 6 seal the outer surfaces, the tail portion 10 is rolled back over itself as shown in FIG. 2b. This continues until the tail portion 10 covers the entire outer surface to be sealed as shown in FIG. 2c. This is easy for a user due to the flexible, resilient elastomer material. As such, rather than have to install two seals, only a single sealing body is provided, which can be provided pre-installed and captive, and simply requires rolling over the outer surfaces rather than separately installing a separate shroud.

The colour of the sealing body can be selected depending upon the type of gland being used. It may alternatively be clear so that the components 2, 3, 4 are still visible.

Figure 3A:
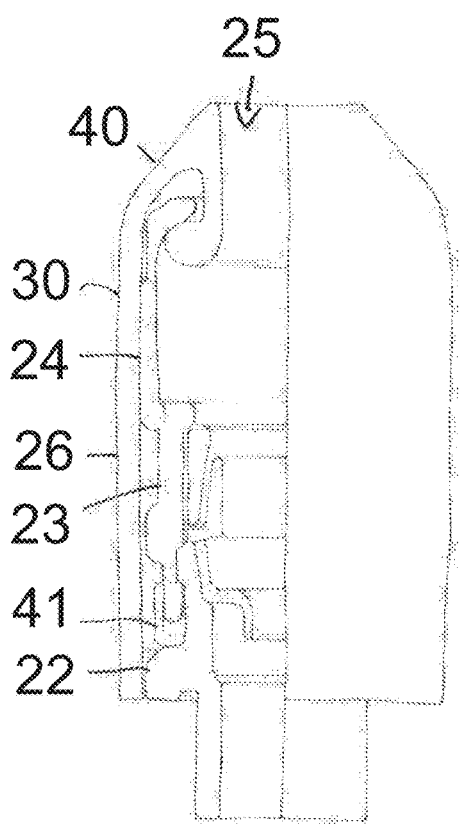
FIGS. 3a and 3b show partial cross sections through a cable gland in accordance with a second embodiment of the invention, with the sealing body positioned so as to accommodate cables of different diameters.
Figure 3B:
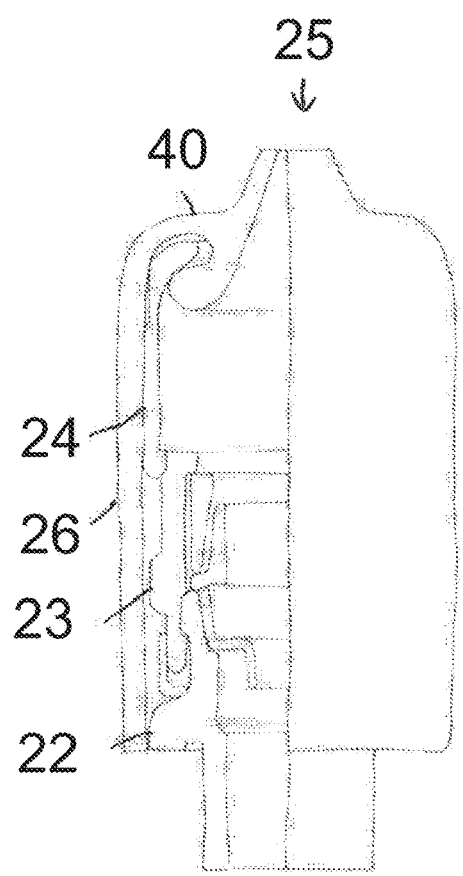

A second embodiment of the invention is shown in FIGS. 3a and 3b of the accompanying drawings. Equivalent features to those of the first embodiment have been given corresponding reference numerals, raised by 20.

In this embodiment, the shape of the tail portion 30 of the sealing body 26 is such that, with the cable gland vertical with the back component 24 uppermost, liquid falling on a sloped uppermost portion 40 of the sealing body adjacent to the through bore 25 will not pool; the slope of the sloped portion 40 will cause any such liquid (rain, spray, etc) to run off the sealing body 26.

Furthermore, the sealing body is shaped so as to accept a range of diameters of cable. FIG. 3b shows the sealing body 26 in its most constricted state, where it can accept the narrowest cable in the range, whereas FIG. 3a shows the same sealing body 26 in the position where it has accepted a much wider cable (not shown). In both cases, the sloped section 40 is such that liquid will run off and not pool.

In this embodiment, whilst the sealing body 26 does still cover the whole of the outer surface of the components 22, 23, 24, there is provided a deluge boot 41 to seal the entry component 22 relative to the middle component 23.

Figure 4:
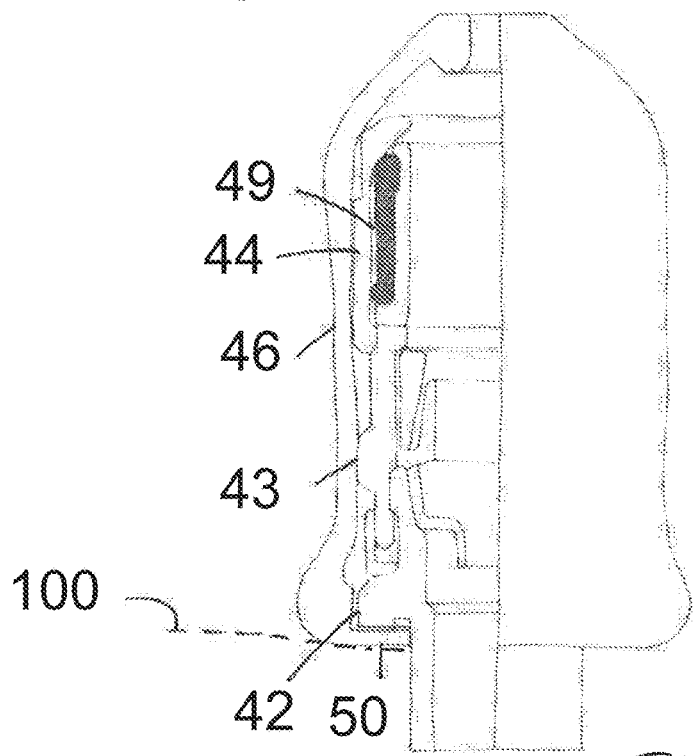

A third embodiment of the invention is shown in FIG. 4 of the accompanying drawings. Equivalent features to those of the first embodiment have been given corresponding reference numerals, raised by 40.

In this embodiment, the sealing body 46 provides a seal 50 between the entry component 42 and the surface 100 against which it is to be sealed. This therefore takes the place of an ingress protection washer (IP washer). Once installed, the sealing of the entry component 42 against the surface 100 will hold the sealing body 46 captive. The sealing body 46 again extends over the outer surfaces of the entry 42, middle 43 and back 44 components, and acts to seal at least the back component 44 relative to the middle component 43 as a shroud. A separate seal 49 seals the cable (not shown) relative to the back component 44.

A fourth embodiment of the invention is shown in FIG. 5 of the accompanying drawings. Equivalent features to those of the first embodiment have been given corresponding reference numerals, raised by 60. This and the following embodiment are particularly useful with non-metallic back components.

In this embodiment, the sealing body 66 again provides a seal 70 between the entry component 62 and the surface 100. However, the tail portion 71 only extends as far as the junction between the back 64 and middle 63 components. This still seals the back 64 and middle 63 components, but a separate deluge boot 81 is provided to seal the entry 62 and middle 63 components, and a separate seal 69 to seal the back component 64 to the cable (not shown).

A fifth embodiment of the invention is shown in FIG. 6 of the accompanying drawings. Equivalent features to those of the first embodiment have been given corresponding reference numerals, raised by 100. This and the following embodiment are particularly useful with non-metallic back components.

In this embodiment, the sealing body 106 provides a seal 110 between the entry component 102 and the middle component 103. Again, the tail portion 111 only extends as far as the junction between the back 104 and middle 103 components. This still seals the back 104 and middle 103 components, but a separate IP washer will be required, and a separate seal 109 to seal the back component 104 to the cable (not shown).

A sixth embodiment of the invention is shown in FIG. 7 of the accompanying drawings. Equivalent features to those of the first embodiment have been given corresponding reference numerals, raised by 150.

In this embodiment, the sealing head 159 provides a seal 70 between the back component 154 and the cable (not shown). However, it extends much further through the through bore 155 and as such the tail portion 160 forms part of the cable clamp (such clamps being described in, for example, our earlier PCT application WO2019/220146), and is held captive within the clamp. The tail portion 160 extends over the entire outer surface of the components 152, 153, 154 and so seals the back 64 and middle 63 components. A separate deluge boot 181 is provided to seal the entry 152 and middle 153 components.

The invention claimed is:

1. A cable gland comprising:
   an entry component sized to fit through an orifice in a surface and having a flange arranged to bear against the surface around the orifice;
   a middle component in threaded engagement with the entry component; and
   a back component in threaded engagement with the middle component, the cable gland defining a through bore for a cable through the entry component, the middle component and the back component;
   the cable gland further comprising a sealing body which is arranged to provide a seal in at least two positions from a group comprising:
   a. between the surface and the flange of the entry component;
   b. between the cable and the back component;
   c. between the back component and the middle component; and
   d. between the middle component and the entry component,
   wherein the sealing body is formed of a resilient material,
   wherein the sealing body can be stretched and rolled over an outer surface at least one, two or three of the entry component, middle component and back component,
   wherein the sealing body has an internal through bore through which the cable can pass and the sealing body is shaped such that the through bore for the cable can accept a range of diameters from a narrowest cable diameter to a cable diameter less than a size of the entry component, with stretching of the resilient material accommodating for varying sizes of the cable whilst still providing the seal in the at least two positions throughout the range of diameters.

2. The cable gland of claim 1, in which the sealing body is of a form of a shroud.

3. The cable gland of claim 1, in which the sealing body is anchored relative to the entry component, the middle component and the back component by being held captive in at least one position at which the sealing body acts as a seal.

4. The cable gland of claim 1, in which the sealing body is shaped so that, when rolled, rolls back over itself and uncovers an outer surface(s) of the sealing body.

5. The cable gland of claim 1, in which the sealing body is shaped such that, when the cable gland is positioned with the sealing body providing the seal in the at least two positions and with an exit orifice of the through bore in the back component uppermost, the seal does not pool liquid that falls vertically onto it.

6. A method of installing a sealing body on a cable gland, the method comprising
   providing a cable gland comprising:
      an entry component sized to fit through an orifice in a surface and having a flange arranged to bear against the surface around the orifice;
      a middle component in threaded engagement with the entry component; and
      a back component in threaded engagement with the middle component,
   the cable gland defining a through bore for a cable through the entry component, the middle component and the back component;
   the cable gland further comprising the sealing body which is arranged to provide a seal in a position selected from a group comprising:
   a. between the surface and the flange of the entry component;
   b. between the cable and the back component;
   C. between the back component and the middle component; and
   d. between the middle component and the entry component;
   the method further comprising inserting a cable through the through bore and moving the sealing body so as to seal another position from the group,
   wherein the sealing body is formed of a resilient material,
   wherein the step of moving the sealing body comprises rolling or sliding the sealing body over an outer surface of at least one of the entry component, the middle component and the back component, and
   wherein the sealing body has an internal through bore through which the cable can pass and the sealing body is shaped such that the through bore for the cable can accept a range of diameters from a narrowest cable diameter to a cable diameter less than a size of the entry component, with stretching of the resilient material accommodating for varying sizes of the cable whilst still providing the seal in the at least two positions throughout the range of diameters.

* * * * *